United States Patent [19]

Meyer et al.

[11]  4,279,962

[45]  Jul. 21, 1981

[54] PROTECTIVE COATING FOR CATHODICALLY PROTECTED METAL SURFACES

[75] Inventors: Rainer-Leo Meyer, Krämerstrasse 1, D-7580 Bühl-Vimbuch, Fed. Rep. of Germany; Rainmar John, Achern, Fed. Rep. of Germany; Bernhard Eisenhauer, Rastatt, Fed. Rep. of Germany; Herta Baumstark, Rheinmünster, Fed. Rep. of Germany

[73] Assignees: Olga Meyer; Rainer Meyer, both of Bühl, Fed. Rep. of Germany

[21] Appl. No.: 100,207

[22] Filed: Dec. 4, 1979

[30] Foreign Application Priority Data

Dec. 20, 1978 [DE] Fed. Rep. of Germany ....... 2855120

[51] Int. Cl.$^3$ .......................... B32B 15/08; B32B 15/18
[52] U.S. Cl. .................................... 428/332; 427/409; 427/410; 428/414; 428/418; 428/423.3; 428/425.9; 428/468; 428/402
[58] Field of Search ............... 428/324, 328, 332, 402, 428/413, 423.3, 425.9, 468; 427/202, 203, 205, 409, 410

[56] References Cited

U.S. PATENT DOCUMENTS

| 3,360,391 | 12/1967 | Richzenhain et al. | ............... 427/413 |
| 3,499,783 | 3/1970 | Nelson et al. | ..................... 428/423.3 |
| 3,598,659 | 8/1971 | Klingler et al. | ..................... 427/413 |
| 3,756,845 | 9/1973 | Zasadny et al. | .................. 428/423.3 |

*Primary Examiner*—Paul J. Thibodeau
*Attorney, Agent, or Firm*—Frishauf, Holtz, Goodman & Woodward

[57] ABSTRACT

To provide a cover coating for metal surfaces subject to corrosion by water, typically steel surfaces in salt water, for ships, structural components, and the like, in which cathodic protection by application of a negative voltage to the metal is provided, a two-layer coating is applied in which the base coating applied to the metal comprises a mixture of finely divided zinc and polyisocyanate prepolymers capable of hardening or curing under ambient humidity, with dryers, gelling, and pigment agents, and high boiling point solvents, covered by a cover coating, preferably in two to three layers, of a mixture of tar with polyisocyanates, fillers, dryers, solvents, and micaceous iron ore or hematite powder.

12 Claims, No Drawings

PROTECTIVE COATING FOR CATHODICALLY PROTECTED METAL SURFACES

The present invention relates to a protective coating for cathodically protected surfaces, and more particularly to a coating to protect steel surfaces, such as ship hulls, bridge girder and structural elements and the like which are exposed to water and more particularly to salt water.

BACKGROUND AND PRIOR ART

It is well known to protect iron and steel structural elements against corrosion by a suitable paint or coating. Structural elements made of iron and steel and submerged in water, particularly hulls of ships and the like, frequently are protected not only by a paint or similar coating, that is, by a passive corrosion protection, but additionally by an active corrosion protection by subjecting the steel plate to an electrical voltage. Cathodic corrosion protection involves connecting the steel object which is to be protected as a cathode with respect to one or more anodes and applying a protective current thereto, to maintain the article to be protected at a predetermined negative protective voltage. A suitable range is in the order of about $-950$ to $-1150$ mV, measured with respect to an Ag/AgCl cell.

It has been found that customary paint coatings and similar coatings applied on steel surfaces as a protection against corrosion are damaged by the additional cathodic electrical loading if a combination of paint protection and cathodic protection is desired. Customary paint coatings, upon being cathodically loaded, are prone to form bubbles. In one coating which has recently become available to be applied to steel surfaces, a current density in the order of about 50 mA/m$^2$ is required in order to maintain a suitable protective potential thereon. As the age of the paint coating increases, the current density to maintain the protective potential rises, and may reach values in the order of 100 mA/m$^2$ and thereover. As the current density increases, the tendency to form bubbles also increases.

THE INVENTION

It is an object to provide a protective coating which is compatible with cathodic corrosion protection arrangements.

Briefly, in accordance with the invention, the protective coating which is compatible with cathodic protection, particularly for steel surfaces, is characterized by a dual-layer coating, in which a base coat is first applied which is of the zinc powder type and capable of hardening under influence of humidity in ambient air and having a composition—with all parts by weight—generally as follows:
- 6–10 parts polyisocyanate-prepolymer with an NCO content of about 16% and capable of hardening under ambient humidity,
- 7–9 parts high boiling point aromatic solvent,
- 0.01–0.03 parts deaeration substance,
- 0.3–0.8 parts drying and stabilizing substance,
- 3–6 parts gelling substance,
- 0.3–0.5 parts wetting agent,
- 4–7 parts pigment in flake form and
- 65–75 parts zinc powder and a cover coating which comprises a polyurethane-tar coating capable of hardening under ambient air humidity comprising:
- 16–20 parts aromatic polyisocyanate with an NCO content of 5–7%,
- 1–3 parts liquid higher molecular polyisocyanate with an NCO content of 3–4%,
- 5–20 parts tar with a viscosity of 5600 to 6400 poise/25° C.,
- 6.5–8 parts drying agent,
- 0.05–0.1 parts deaeration agent,
- 3.5–4.5 parts precipitation prevention agent,
- 30–40 parts micaceous iron ore or hematite powder,
- 5–10 parts inorganic filler,
- 2–5 parts stabilizing agent and
- up to 10 parts solvent.

The dual coating system in accordance with the invention does not have a tendency to form bubbles even under cathodic loading and, further, has excellent adhesion, a surface which is free from pores, high abrasion resistance and high resistance to changing due to aging. The coating system preferably includes a base coat formed of two individual coatings or layers and a cover coat formed likewise of two individual coatings or layers, in which each coating or layer of the base coat itself has a thickness of about 75 μm, and each coating or layer of the cover coating has a thickness of about 125 μm. A steel surface coated in accordance with the system as described can be cathodically protected by applying a voltage in the customary range, but the current flowing is only about 10 mA/m$^2$. Thus, the current consumption for cathodic protection against corrosion in accordance with the system of the invention is substantially less than the current consumption of previously coating systems.

The various compositions used in the coating systems and commercially known and available, and it is their combination and interaction which provides the surprising effect of freedom from formation of bubbles even when electrically loaded.

In a preferred form, the surface to be coated is first sandblasted. The zinc powder base coat is then applied. All parts referred to hereinafter will be parts by weight. A binder component of 6–10 parts is used, preferably a polyisocyanate-prepolymer with an NCO content of about 16%, capable of hardening in ambient humidity, for example "Desmodur E 21" of the Bayer firm. The zinc coating portion further includes 3–6 parts of gel, preferably in form of a finely dispersed powder of dimethyl-dioctadecyclammonium-montmorillonite, for example "Bentone 34" of the Titan-Gesellschaft (Titanium Company), or of an organic derivative of montmorillonite, prepared by ion exchange reaction of montmorillonite with alkylammonium bases, for example "Bentone 38". Further, 4–7 parts of a scale-like or flake pigment, preferably in form of micro powder of a naturally ingrown mixture of muscovite, chlorite and quartz with a grinding fineness of 20 micrometers, such as "Plastorit 0000" of the Talkumwerke Naintsch, and 65–75 parts of zinc powder, preferably of a grain size of about 2.5 micrometers. Additionally, the zinc powder coating contains 0.3 to 0.5 parts of a wetting agent based on a salt of a long-chain polyaminamide and a higher molecular acidic ester, such as "Anti-Terra-U" of the firm Byk-Mallinckrodt, 0.3–0.8 parts of a drying and stabilizing agent, for example the additives "Ti and OF" of the firm Bayer for polyurethane single-component paints, 0.01–0.3 parts of a commercial deaeration agent, such as "Acronal" of the firm BASF, and 7–9% of an aromatic solvent having a boiling point range in the order of about 160°–180° C., for example "Shellsol A"

by the Shell company. A liquid monofunctional isocyanate is desirably used as a dryer and stabilizing agent since it reacts actively with water and binds the water quantitatively. The deaeration agent suitable is a commercial dispersion or solution on the basis of polyacrylic acid esters. The zinc powder coating with the above composition can be applied by brushing on, rolling on, compressed air spraying or airless spraying. It is applied to a steel support surface with a layer of a thickness of about 150 μm. At a relative humidity of 30%, the coating will dry to a cover which is free of pores and having a dry filled thickness of about 75 μm. The zinc powder coating dries rapidly, and after about 20 minutes, a second such coating with a similar dry thickness of 75 μm can be applied.

The dual layer base coating is then covered with a cover coating which is, preferably, also composed of two or three layers, and which includes a polyurethane-tar cover coating capable of drying under the influence of ambient humidity. The cover coating, as the main binder component, has 16-20 parts of an aromatic polyisocyanate with an NCO content of 6-7%, preferably a 60% solution of ethylglycolacetate/xylol 1:1 in which is dissolved an aromatic polyisocyanate with an NCO content of about 6.5%, that is, an NCO equivalent weight of about 646, and available commercially under the name "Desmodur E 1361" by the firm Bayer. The cover coating contains further binder components, such as a slow reacting liquid higher molecular polyisocyanate with an NCO content of 3-4%, preferably a commercial higher molecular polyisocyanate with an NCO content of about 3.5% and a viscosity of about 8000 cp at 20° C., commercially available under "Desmodur E 14" of the firm Bayer. The cover coating further contains 10-12% tar with a viscosity of 5600 to 6400 poise/25° C. Further, it contains 6.5-8 parts of dryer, 0.05-1 part deaeration agent, 3.5-4.5 parts precipitation prevention agent, 30-40 parts micaceous iron ore or hematite powder, 5-10 parts inorganic filler, 2.5 parts stabilizer and up to 10 parts solvent. The dryer, typically, is a monofunctional isocyanate with an NCO content of 21-22% having a flash point of about 140° C., a boiling point of about 270° C. and and a hardening or solidifying point of about 5° C., and an index of refraction of 1.53 at 20 C., for example the additive "TI" of the firm Bayer. The dryer binds quantitatively any water which is present and thus contributes to the storage capability when air is excluded. The deaeration agent preferably is a commercial product which provides for uniform deaeration of the cover coating after application, for example "Acronal" of the firm BASF. The precipitation prevention agent preferably is a finely dispersed clay earth, such as aluminum oxide, which prevents separation or loss of mixing of the components of the cover coating. The micaceous iron ore or hematite powder, basically, has a grain size in the range of about 60-75 μm. The inorganic filler preferably is finely divided talcum. The stabilizer preferably is a commercial stabilizer for polyurethane single-component coatings which decreases the sensitivity of the cover coating to moisture or humidity and generally improves the coating operation, for example the additive "OF" of the firm Bayer. The solvent preferably is a mixture of ethylglycolacetate and xylol, in the relationship of 1:1.

The cover coating, preferably having two or three individual layers or coatings, is then applied over the base zinc coating, also comprising two layers. The top coating is applied with a dry film thickness of about 125 μm per layer. Each one of the applied layers of the top coating will dry or cure in humidity of about 30% to a coating free from pores which has excellent adhesion on the base coating. The top coating hardens to a protective cover free from pores which has excellent chemical and mechanical resistance.

The particular coating as described has excellent compatibility with cathodic protection systems and thus is particularly suitable for underwater use for ships, steel structures, and the like.

EXAMPLE

A sheet of steel, after having been sandblasted, was coated with a base coat of 8 parts of commercial, humidity hardening polyisocyanate-prepolymer ("Desmodur E 21") with an NCO content of 16%, 4 parts of commercial aromatic solvent, "Shellsol A", with a boiling point range of from 160° to 180° C., 0.02 parts of a commercial deaerating agent ("Acronal"), 0.5 parts of a commercial dryer and stabilizer for polyurethane single-component paints, the additives "TI" and "OF", 4 parts dimethyldioctadecyclammonium-montmorillonite, that is, "Bentone 34", 0.4 parts of a commercial wetting agent, "Anti-Terra-U", based on a salt of a long-chain polyaminamide and a high molecular acidic ester, 6 parts of finely ground powder of a naturally occuring mixture of muscovite, chorite and quartz, namely "Plastorit 0000", and 70 parts of fine zinc powder with an average grain size of 2.5 μm. The drying film thickness of each one of two such base coats was 75 μm.

A cover coating of three layers was then applied using a coating mixture of 18 parts of commercial aromatic polyisocyanate with an NCO content of 6.5 in form of a 60% solution in ethylglycolacetate/xylol, in a relationship of 1:1, commercially available as "Desmodur E 1361", 2 parts of commercial liquid higher molecular polyisocyanate with an NCO content of 3.5%, commercially available as "Desmodur E 14", 10 parts tar with a viscosity of 6000 poise at 25° C., 6 parts of dryer, additive "TI", in form of a liquid isocyanate with an NCO content of 21-22%, 0.2 parts of commercial polyvinylether based deaeration agent, known as "Acronal", 3.5 parts of finely dispersed clay, 25 parts micaceous iron ore or hematite powder with a particle size in a range of 60-75 μm, 8 parts of microfine talcum, 5 parts ethylglycolacetate, 5 parts xylol, and 2 parts of a commercial stabilizer for polyurethane single-component paints, such as additive "OF".

Each one of the three layers of the top coating had a dry film thickness of about 150 μm. The coated sheet steel was suspended in seawater and connected over a resistor to a protective anode. A protective potential of −1000 mV was applied by means of a potentiometer. The protective current density to maintain this voltage was only about 10 mA/m$^2$ and did not change even in the course of an experimental period of several months. The coating also, after an experimental period of several months, was in excellent condition.

The foregoing examples of the composition show preferred materials and relative proportions. These materials and proportions are not entirely critical, however.

The 6-10 parts polyisocyanate-prepolymer with an NCO content of about 16% can be varied since the NC content can be between about 12 to 20%. If less than the lower limit, for example 6% polyisocyanate or about 12% NCO content, respectively, is used, adhesion will become poor and the system will not function as a zinc powder system. Upon increasing the polyisocyanate to about 10% or about 20% NCO content, respectively, the metallic contact also will be poor. 16% is the preferred mean within the limits and where adhesion is satisfactory.

Rather than using polyisocyanate-prepolymer, which is a one-component material, a two-component epoxy resin comprising a basic component and a curing agent may be used. Such epoxy resins are commercially available, for example Enertolpoxitar sold by Lechler-Chemie, Stuttgart, Fed. Rep. Germany. This system is not humidity hardening.

The high boiling aromatic solvent can be replaced by a low boiling aromatic solvent, for example by toluol, xylol, or a suitable ester. If one uses less than 7%, the solubility becomes insufficient; if one takes more than 9%, the system will be too thin and liquid. The range of from 7% to 9% has been found to be eminently satisfactory.

The deaerating substance, preferably present in a small quantity of from 0.01% is a special soft resin. One suitable type is the material sold as "Blister-free" by the Schwegmann company of Bonn, Fed. Rep. Germany. If one takes less than the lower limit, there will be insufficient deaeration, if too much, the system becomes lumpy and will not dry well or only incompletely.

The drying and stabilizing substance, preferably, is a poly-isocyanate. The range of between 0.3% to 0.8% is the optimum; less than the lower limit causes thickening of the overall system and difficulty in application, that is, it will not be liquid enough. If too much is taken, the efficiency of the paint as such is not greatly degraded; however, its storage and shelf life becomes unsatisfactory.

The gelling substance, preferably, is an alumina or argillaceous earth of the kind used in paints of this type; the particular type of gelling substance to be used, and the best amounts with respect to the remainder of the composition can be easily determined by standard tests well known in this field. Using either appreciably more or less than the given quantity of 3 to 6 parts will detract from appropriate gelling, and result in poor gelling effects.

The preferred wetting agent is a polyamide. If less than the lower limit is used, the consistency of the system deteriorates; more than the upper limit will make the system too liquid for usual type of application.

The scale-form pigment, preferably, is a mineral filling material in flake form.

The zinc powder preferably has a particle size of between 1 to 20 $\mu m$, with a median value of about 2.5 $\mu m$.

The cover coating provides an opaque color. If the NCO content is too low, for example 4% or less, the system would not cure properly; increasing the NCO content much above 7%, for example above 8% or more, may result in health problems. Likewise, if the polyisocyanate is substantially decreased or increased, respectively, below 15% and above 21%, either the system would not cure properly or may pose a health hazard.

As with the polyisocyanate for the base coat, a two-component epoxy resin can be used which, however, does not cure under conditions of humidity.

The higher molecular polyisocyanate, if present with a content of less than 3% NCO, makes the system too liquid; if the NCO content is above 4%, the system would be too hard, particularly when using two-component epoxy resins, and the elasticity of the resulting coating would be impaired.

The range of the tar content may be very wide, 5%–20%; a range of between 10% to 12%, however, is preferred. If a lesser amount of tar is used, the system would effectively be a no-tar system, with too low water repellency. More than 20% lowers the mechanical stability and softens the overal coating too much.

The drying agent, preferably, is a liquid isocyanate monomer. Less than 6.5 parts causes the system to thicken; more than 8% detracts from shelf life and storage ability. The relative proportion of the drying agent—preferably within the range of 6.5-8 parts will depend, however, on the overall humidity content of the system.

The precipitation prevention agent, if present in excessive quantity, would result in insufficient hardness; if too little is used, the system suspension will not be maintained and excessive stirring will be needed. A preferred substance is the same as the gelling substance, that is, alumina or argillaceous earth. The micaceous iron ore or hematite powder can be replaced by other mineral filling substances, for example Plastorit, produced in Austria, and a commercially available substance. Generally, a mixture of $SiO_2$, Al, Mg in form of a dry powder is used.

The inorganic fillers which are preferred are usually different types of talcum, that is, mainly calcium carbonate and earth alkali salts. A particularly suitable type of talcum is commercially available under the name of "Norwegian talcum".

The mineral filler and the inorganic filler together cooperate to provide good stability, cohesion and adhesion. Using less than lower limit given above leads to insufficient stability, cohesion and adhesion. Using too much results in insufficient binder being present in the remainder of the system, so that the pigments are not bound sufficiently. A roughly intermediate range for both the mineral filling substances and the inorganic filler is preferred, with the overall presence of both mineral filler and inorganic filler preferably not exceeding about 45 parts, overall. The stabilizing agent, preferably, is a hydrophilic isocyanate. Using less than about 2 parts (by weight) leads to instability; using more than 5 parts may result in separation of phases.

The coating preferably uses a solvent, although it is possible to omit the solvent; using an excess of about 10 parts renders the system too liquid, thus impairing the continuity of the film of the painting system. Any kind of aromatic solvents or esters can be used.

In general, a preferred paint would use approximately the median quantities within the ranges discussed above; the effect of variation of the quantities and relative quantities within the overall system will readily lead to a particular composition suitable for specific applications.

We claim:

1. Protective coating on a cathodically protected metal surface comprising a base coating and a cover coating, in which the base coating includes a zinc powder capable of hardening or curing under ambient air humidity and having a composition, all parts being approximate and by weight, comprising:

6–10 parts polyisocyanate-prepolymer with an NCO content of about 16% and capable of hardening under ambient humidity, 7–9 parts high boiling point aromatic solvent, 0.01–0.03 parts deaeration substance,
0.3–0.8 parts drying and stabilizing substance,
3–6 parts gelling substance,
0.3–0.5 parts wetting agent,
4–7 parts pigment in flake form and
65–75 parts zinc powder and
a cover coating which comprises a polyurethane-tar coating capable of hardening under ambient air humidity comprising:
16–20 parts aromatic polyisocyanate with an NCO content of 5–7%,
1–3 parts liquid higher molecular polyisocyanate with an NCO content of 3–4%,
5–20 parts tar with a viscosity of 5600 to 6400 poise/25° C.,
6.5–8 parts drying agent,
0.05–0.1 parts deaeration agent,
3.5–4.5 parts precipitation prevention agent,
30–40 parts micaceous iron ore or hematite powder,
5–10 parts inorganic filler, and
2–5 parts stabilizing agent.

2. Coating according to claim 1, wherein the gelling substance in the zinc-based coating comprises at least one of the materials selected from the group consisting of: dimethyldioctadecyclammonium-montmorillonite; an organic derivative of montmorillonite derived from montmorillonite by iron exchange reaction with alkylammonium bases.

3. Coating according to claim 1, wherein the flaked pigment in the zinc-based coating is a finely ground flour of a naturally occurring mixture of muscovite, chlorite and quartz.

4. Coating according to claim 1, wherein the precipitation prevention agent of the cover coating is finely dispersed clay.

5. Coating according to claim 1, wherein the filler in the cover coating is microfine talcum.

6. Coating according to claim 1, wherein the base coating comprises a two-layer coating, each having a dry film thickness of about 75 μm, and the top coating comprises at least two layers, each with a dry film thickness of about 125 μm.

7. Coating according to claim 1, wherein the tar is present in about 10–12 parts.

8. Coating according to claim 1, wherein the cover coating includes up to about 10 parts solvent.

9. Coating according to claim 1, wherein the components are present in quantities approximately midway within the ranges recited in claim 1.

10. Protective coating on cathodically protected surface comprising a base coating and a cover coating, in which the base coating includes a zinc powder capable of hardening or curing under ambient air humidity and having a composition, all parts being approximate and by weight, comprising:
6–10 parts of an epoxy-type resin,
7–9 parts high boiling point aromatic solvent,
0.01–0.03 parts deaeration substance,
0.03–0.8 parts drying and stabilizing substance,
3–6 parts gelling substance,
0.3–0.5 parts wetting agent,
4–7 parts pigment in flake form and
65–75 parts zinc powder and
a cover coating which comprises a polyurethane-tar coating capable of hardening comprising
16–20 parts of an epoxy-type resin,
1–3 parts liquid higher molecular polyisocyanate with an NCO content of 3–4%,
5–20 parts tar with a viscosity of 5600 to 6400 poise/25° C.,
6.5–8 parts drying agent,
0.05–0.1 parts deaeration agent,
3.5–4.5 parts precipitation prevention agent,
30–40 parts micaceous iron ore or hematite powder,
5–10 parts inorganic filler, and
2–5 parts stabilizing agent.

11. Coating according to claim 10, wherein at least one of the epoxy resins is a two-component resin.

12. Coating according to claim 10, wherein at least one of the epoxy resins is a one-component resin capable of hardening under ambient air humidity condition.

* * * * *